(12) United States Patent
Rastogi et al.

(10) Patent No.: US 10,089,675 B1
(45) Date of Patent: Oct. 2, 2018

(54) PROBABILISTIC MATRIX FACTORIZATION SYSTEM BASED ON PERSONAS

(71) Applicant: Amazon Technologies, Inc., Seattle, WA (US)

(72) Inventors: Rajeev Ramnarain Rastogi, Bangalore (IN); Varnit Agnihotri, Shikohabad (IN); Rushi Bhatt, Bangalore (IN); Srujana Merugu, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 442 days.

(21) Appl. No.: 14/918,445

(22) Filed: Oct. 20, 2015

(51) Int. Cl.
| | |
|---|---|
| *G06Q 30/00* | (2012.01) |
| *G06Q 30/06* | (2012.01) |
| *G06Q 10/06* | (2012.01) |
| *G06F 17/18* | (2006.01) |
| *G06F 7/60* | (2006.01) |
| *G06F 17/10* | (2006.01) |

(52) U.S. Cl.
CPC ........... *G06Q 30/0631* (2013.01); *G06F 7/60* (2013.01); *G06F 17/10* (2013.01); *G06F 17/18* (2013.01); *G06Q 10/067* (2013.01)

(58) Field of Classification Search
CPC .... G06Q 30/0631; G06Q 10/067; G06F 7/60; G06F 17/10; G06F 17/18
USPC ........................................................ 705/26.7
See application file for complete search history.

(56) References Cited

U.S. PATENT DOCUMENTS

| | | | | |
|---|---|---|---|---|
| 6,173,280 | B1* | 1/2001 | Ramkumar | G06F 17/30539 |
| 9,727,826 | B1* | 8/2017 | Lindstrom | G06N 99/005 |
| 2008/0243637 | A1* | 10/2008 | Chan | G06Q 30/02 |
| | | | | 705/26.1 |
| 2010/0042460 | A1* | 2/2010 | Kane, Jr. | G06Q 30/02 |
| | | | | 705/14.69 |
| 2012/0221952 | A1* | 8/2012 | Chavez | G06Q 10/00 |
| | | | | 715/733 |
| 2013/0103371 | A1* | 4/2013 | Huang | G06N 7/005 |
| | | | | 703/2 |
| 2014/0006166 | A1* | 1/2014 | Chiang | G06Q 30/0269 |
| | | | | 705/14.64 |
| 2014/0074639 | A1* | 3/2014 | Tian | G06O 30/0631 |
| | | | | 705/26.1 |

(Continued)

OTHER PUBLICATIONS

Zhan Li & Jin-Ye Peng & Guo-Hua Geng & Xiao-Jiang Chen & Pan-Pan Zheng "Video recommendation based on multi-modal information and multiple kernel", Published online: Jan. 7, 2014,(C)Springer Science+Business Media New York 2014.*

(Continued)

*Primary Examiner* — Yogesh C Garg
(74) *Attorney, Agent, or Firm* — Knobbe, Martens, Olson & Bear, LLP

(57) ABSTRACT

Data mining systems and methods are disclosed for associating users with items based on underlying personas. The system associates each user account with one or more underlying personas that contribute to the user's interactions with different items, and models user-to-item associations in accordance with the underlying personas based on probabilistic matrix factorization. The system may further predict an active persona for a user based on the user's recent interactions with items and make item related recommendations that are oriented to the active persona.

20 Claims, 4 Drawing Sheets

(56) References Cited

U.S. PATENT DOCUMENTS

| | | | | |
|---|---|---|---|---|
| 2014/0156231 A1* | 6/2014 | Guo | ......................... | G06F 17/18 |
| | | | | 703/2 |
| 2016/0110794 A1* | 4/2016 | Hsiao | ................. | G06Q 30/0631 |
| | | | | 705/26.7 |
| 2017/0109642 A1* | 4/2017 | Kawale | ................. | G06N 7/005 |

OTHER PUBLICATIONS

Agarwal, D., and B.-C. Chen, Regression-Based Latent Factor Models, Proceedings of the 15th ACM SIGKDD International Conference on Knowledge Discovery and Data Mining, Jun. 28-Jul. 1, 2009, Paris, France.

Koren, Y., et al., Matrix Factorization Techniques for Recommender Systems, IEEE, Aug. 2009, pp. 42-49.

Salakhutdinov, R., and A. Mnih, Bayesian Probabilistic Matrix Factorization Using Markov Chain Monte Carlo, Proceedings of the 25th International Conference on Machine Learning, Helsinki, Finland, 2008.

\* cited by examiner

PROBABILISTIC MATRIX FACTORIZATION SYSTEM BASED ON PERSONAS

BACKGROUND

A variety of data mining systems and methods are known for detecting associations between items stored or represented in a database and users who may be interested in the items. For example, in the context of an electronic catalog system that provides a large variety of items, a system may monitor user interactions (e.g., viewing, purchasing, downloading, commenting, rating, reviewing, etc.) with the items. Based at least partly on the monitored interactions, the system's data mining processes may determine a user's favorability, affinity, or other associations with individual items that the user has interacted with. The user's affinities for particular items in combination with applicable item-to-item associations can be used to select additional items to recommend to the user. A same computer or user account, however, may be shared by multiple people (e.g., family members), which may result in recommendations that are not tailored to the interests of any particular person.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
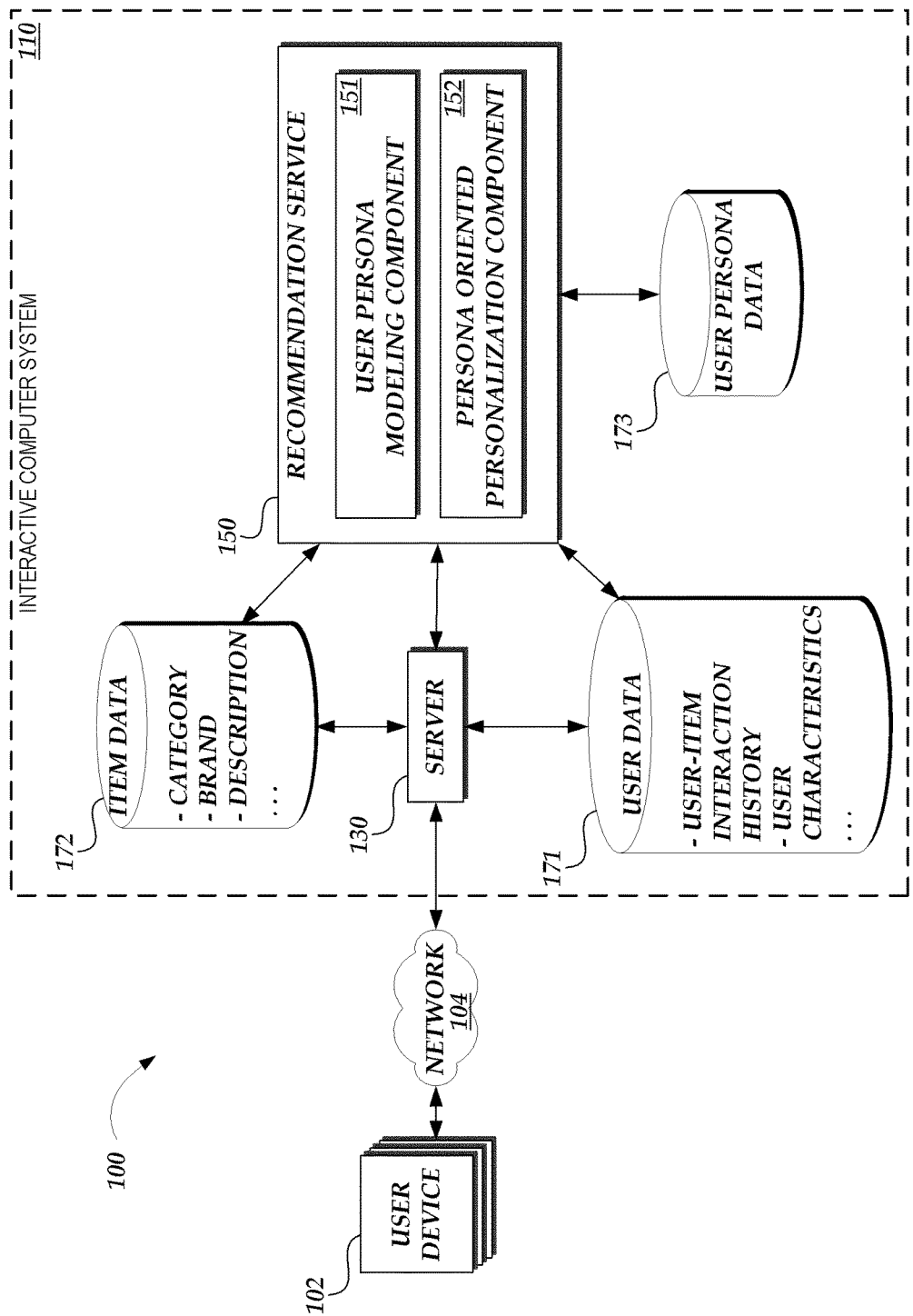
FIG. 1 illustrates an embodiment of a system for modeling and determining user-to-item associations based on personas associated with the users.

User interactions with items (e.g., purchasing, renting, licensing, searching, browsing, downloading, installing, adding to a wish list, saving, tagging, recommending, commenting on, or subscribing to any one of the items) are often monitored by various computer systems for determining user groups' or individual user's favorability, affinity, or other associations with items. The items may, for example, be products or services represented in an electronic catalog, documents, web pages, web sites, news stories, media files, keywords or content indexed by a search engine, RSS or other feeds to which users can subscribe, travel destinations represented on a travel agency site, and/or service providers from which services can be requested. Various data mining techniques can be applied to the user-to-item interaction data for predicting or estimating associations between users and items for which corresponding user-to-item interaction data is unavailable, unreliable, or insufficient. A computer system may further make personalized or customized recommendations of items to users based on the predicted or estimated associations. For example, some collaborative filtering methods may estimate a user's rating for an item based on either (1) ratings of neighboring items by the same user, or (2) ratings of the same item by neighboring users. Here, an item's neighbors may be other items that tend to get similar ratings when rated by the same user, and a user's neighbors may be other users that tend to give similar ratings to the same item.

However, real-world user interaction data presents challenges to the user-to-item association prediction. For example, most real-world datasets are sparse, that is, a bulk of users and items have very few interactions among them. Typically, a small fraction of users and items account for a large fraction of observed interactions (e.g., user ratings or reviews on items) while the remaining are sparsely distributed among others. As another example, real-world environments are highly dynamic with new users and new items constantly joining in, for which the system may not have any interaction or association data. As still another example, individual users may be associated with multiple underlying personas. Illustratively, a user may search, browse, or shop for his or her families (e.g. spouse, children), allow family members or friends to share a same user account, purchase gifts for another person, or have several independent item-related interests. Thus, a user's association with items may be attributable to multiple underlying personas with widely varying tastes and preferences. However, individuals who share a computer or account are commonly presented with personalized content, such as recommendations, that are based on activities of other personas that share the account. In order to make accurate or meaningful predictions, the system may wish to separate out these personas and learn the individual preferences for each user persona.

The present disclosure generally relates to the use of data mining methods for modeling user-to-item associations in accordance with underlying personas and for determining active personas for users based on the association model. In accordance with an illustrative embodiment, a recommendation service associated with an electronic catalog system, a search engine system, a content management system, or another type of item management system retrieves or maintains, in one or more associated databases, historical data of interactions between individual user accounts and items managed by the system. The recommendation service determines, based on an automated analysis of the history of user interactions, underlying personas associated with user accounts. The automated analysis may determine the number, nature, likelihood, and/or other attributes associated with the underlying personas and, in accordance with one embodiment, is done independent of an explicit indication of personas (e.g., different user profiles explicitly defined, indicated, or selected by a user) for this determination. In some embodiments, the automated analysis is performed by a computing system without human interaction. It should be noted that "user" and "user account" may be used interchangeably in appropriate context within the present disclosure. "User" therefore does not necessarily refer to a single person, but may instead refer to a group of people who share a computer or account.

In some embodiments, the recommendation service may cluster or group items based on their category, type, utility, affiliation, combinations of the same or the like, and attribute user interactions with items within a particular item group or a particular combination of item groups to a corresponding underlying persona. During a browsing session associated with the user account, the recommendation service may record a sequence of user interactions with items and match the sequence of user interactions with one or more of the item groups. The recommendation service may determine a persona that is currently active for the user account based on the personas corresponding to the matched item groups (e.g., a persona that accounts for the most number of matches). During the same browsing session, the recommendation service may then generate and present item recommendations that are personalized for the active persona. Thus, for example, even though multiple family members may share a computer and/or account, the content (e.g., item recommendations) presented during a browsing session may be based primarily or exclusively on the past browsing behaviors of the particular individual conducting the browsing session.

In other embodiments, the recommendation service may generate or implement probabilistic matrix factorization models to characterize user-to-item associations based on underlying personas. The model may map individual users to a respective mixture of multiple latent factors, each corresponding to a single persona and drawn from a Gaussian distribution. In accordance with the model, measurement of a user's association with an item (e.g., the user's rating for the item) may be determined by computing a weighted average of association measures for the item across the different personas for the user. In accordance with the model, latent factors corresponding to personas underlying a user may be represented as regression over features, attributes, or other characteristics of the corresponding user account (e.g. user age, gender, location, subscription, preference, income, spending, etc.), latent factor corresponding to an item may be represented as regression over features, attributes, or other characteristics of the item (e.g. brand, size, category, type, utility, etc.), and an underlying persona's association with an item can be estimated based on the corresponding latent factors (e.g., a dot product of the persona latent factor and the item latent factor).

The recommendation service may optimize the model based on observed user-to-item association measures. The observed association measures may be explicit user ratings for items that are included in the historical user-to-item interaction data. Alternatively or in addition, observed association measures may be calculated or otherwise derived from the historical user-to-item interaction data. For example, the observed association measure between a user and an item may be a weighted average of the numbers of respective positive interactions (e.g., purchasing, searching and dwelling, subscribing to, recommending, etc.) and the numbers of respective negative interactions (e.g., canceling, returning, skipping, etc.) between the user and the item during a predetermined period of time. As will be described in more detail below, the model optimization may be based on computer generated randomizations, such as Monte Carlo expectation and maximization (EM) methods based on a random number generator (RNG), that are further defined, directed, or constrained by the observed user-to-item association measures. The recommendation service may then estimate a user account's (or a particular underlying persona's) association with a target item using the optimized model. The recommendation service may also determine an active persona for a user based on the user's most recent interactions with one or more items (e.g., browsing, searching, commenting, or the like within the current browse session) in accordance with the model, and then generate item recommendation that is personalized for the active persona for presentation to the user.

FIG. 1 depicts an embodiment of a network environment 100 and system 110 capable of modeling and determining user-to-item associations based on personas, using processes and functionalities disclosed herein. In the environment 100, users can access an interactive computer system 110 with user devices 102. The user devices 102 that access the interactive computer system 110 can include, for example, computing devices, such as desktop computers, laptop computers, tablets, personal digital assistants (PDAs), mobile phones, electronic book readers, other wireless handheld devices, set-top or other television boxes, media players, video game platforms, kiosks, and/or the like. The user devices 102 access the interactive computer system 110 over a network 104, which can be a publicly accessible network of linked networks, possibly operated by various distinct parties, such as the Internet. In other embodiments, the network 104 may include a private network, personal area network ("PAN"), LAN, WAN, cable network, satellite network, any other medium of computer data transfer, or some combination thereof.

The interactive computer system 110 can be implemented with one or more physical servers or other computing machines, each of which includes a hardware processor and a memory. Each of the components depicted in the interactive computer system 110 can include hardware and/or software for performing various functionalities. In some implementations, the interactive computer system 110 may include specialized hardware for performing one or more processes described herein. For example, in some cases, the recommendation service 150 may be implemented using specialized hardware dedicated to user interfacing, item and user related data retrieval and updating, user-to-item association modeling, persona oriented personalization, or item recommendation based thereon. In one embodiment, the interactive computer system 110 is a network site that allows users to interact with items via an electronic catalog, a search engine, a media database, or other content repository, and monitors user interactions with respect to the items. The interactive computer system 110 includes one or more physical servers 130 for receiving, processing, and responding to requests from user devices 102. The one or more servers 130 can include Web servers, application servers, database servers, and/or other types of servers. The servers 130 can be geographically co-located or geographically dispersed.

The one or more servers 130 may access or update information about items in an item database 172. The information may include various item features (e.g., brand, size, type, category, utility, price, grouping, ratings, reviews, author pages, user-generated list pages, forum pages, blog pages, etc.). In one embodiment, at least some of the items are grouped in accordance with a hierarchy or taxonomy. The one or more servers 130 may also access or update information about users in a user database 171 that may store various user features and activity information. User features may include user characteristic or demographic information, such as age, gender, geographic location, occupation, income, spending levels, interests, hobbies, preferences, settings, combinations of the same, and/or the like. User activity information may include information on a user's purchases, selections, clicks, views, searches, ratings, comments, recommendations, page requests, additions or removals of items to wish lists and shopping carts, user interface events, tagging activity, combinations of the same, and/or the like.

The interactive computer system 110 also includes the recommendation service 150 communicatively connected with the servers 130, the user database 171, the item database 172 and a user persona database 173. The user persona database 173 may include relational tables and datasets that store information about the mapping or association among users, underlying personas, and items, user-to-item association model configurations and parameters, model related latent factor metadata (e.g., samples, distributions, etc.), and other data that may be utilized by the processes and functionalities disclosed herein. As will be explained in detail below, portions of the data maintained by the user persona database 173 may be generated by a user persona modeling component 151 or a persona oriented personalization component 152. Various thresholds or other criteria can be used to configure the generation and optimization of the user-to-item association model, the determination of active personas for users, or persona oriented item recommendation based thereon.

It should be noted that functionalities of the various components of the interactive computer system 110 can be distributed across multiple machines, networks, and other computing resources. The various components of the interactive computer system 110 can also be implemented on one or more virtual machines, rather than on dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Figure 2:
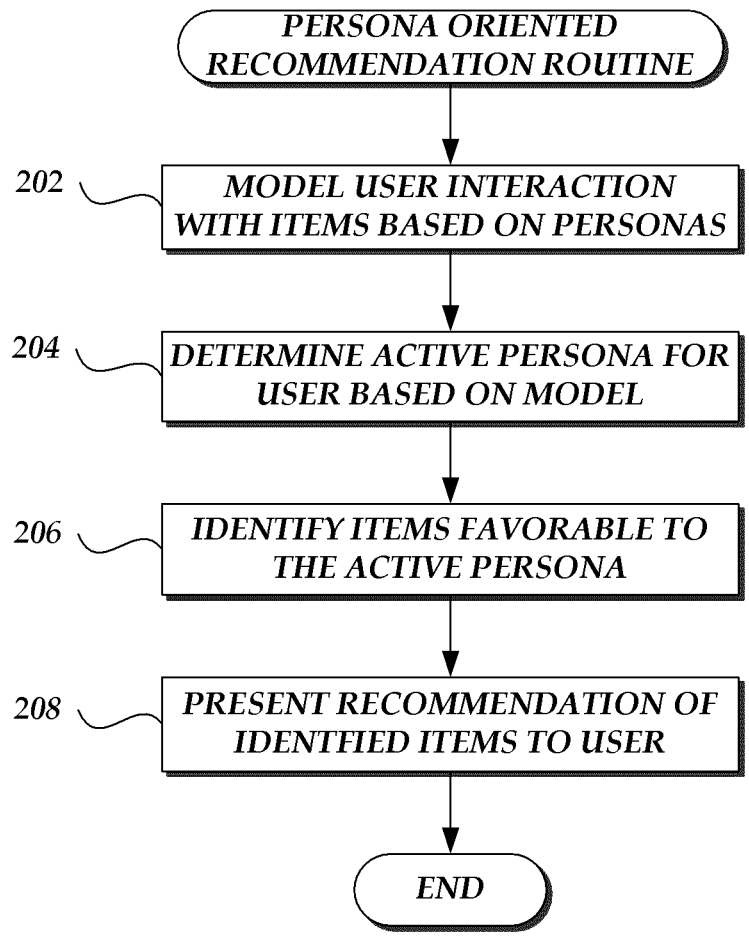
FIG. 2 illustrates an embodiment of a persona oriented recommendation routine implemented by a recommendation service.

FIG. 2 illustrates an embodiment of a persona oriented recommendation routine implemented by the recommendation service 150. At block 202, the recommendation service 150 models user interactions with items based on personas. The model may associate one or more underlying personas with each individual user and attribute each instance of the user's interactions with an item to an underlying persona. The association between a user and its underlying personas may be fixed or probabilistic, and the number of personas corresponding to any user may be predefined or automatically determined. The model may be logically represented, at some level, as a matrix whose two dimensions correspond to distinct users and items respectively. The values represented by each cell of the logical matrix may correspond to a corresponding user-to-item association measure (in either scalar or vector form) that may quantify the user's favorability, affinity, or other relations with the item. The logical matrix may be stored and updated in a computer memory as a matrix type, linked lists type, hash type, or other applicable types of data structure. In some embodiments, the model may be definite based on predetermined clustering or classification of items that correspond to personas. In other embodiments, the model may be fuzzy or probabilistic and may be optimized based on historical user-to-item interaction data.

At block 204, the recommendation service 150 determines an active persona for a target user based on the model. For example, during a recent period of time (e.g., a current browsing session associated with the user), the recommendation service may record a sequence of one or more user interactions with items and apply the model to the sequence. The recommendation service may determine one or more personas that may be currently active for the target user based on the application of the model. In some embodiments, the recommendation service selects a single persona from the determined personas that is most likely to be associated with the target user in accordance with a corresponding probability, likelihood, confidence level, or other measures applicable to the model.

At block 206, the recommendation service 150 identifies one or more items that are relatively favorable to the active persona(s) of the target user based on the user-to-item association measures estimated by the model. The target user may or may not have previously interacted with the relatively favorable items, and the model may or may not have accounted for the existence of such interactions. The identified items can be sorted or ordered based on their corresponding association measures with one or more of the active personas or with the target user (e.g., as a mixture of personas in accordance with the model).

At block 208, the recommendation service 150 presents recommendation of the identified items to the target user. The presentation may be implemented within a threshold period of time (e.g., during a same browsing session) from the recent sequence of interactions between the target user and the items, to ensure that the model has not changed the active persona determinations due to more recent updates to the user-to-item interaction data.

Figure 3:
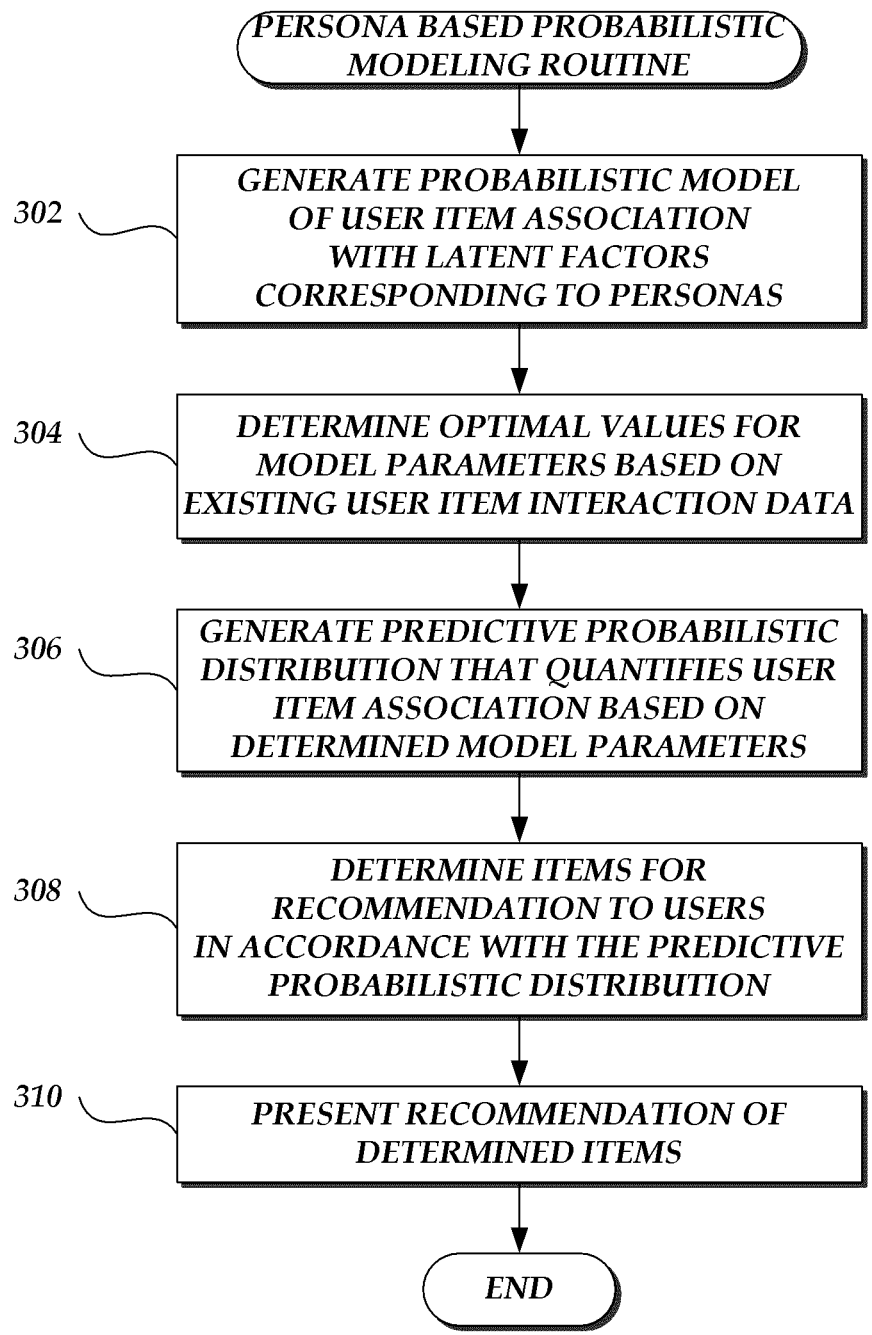
FIG. 3 illustrates an embodiment of persona based probabilistic modeling routine implemented by the recommendation service.

FIG. 3 illustrates an embodiment of persona based probabilistic modeling routine implemented by the user persona modeling component 151 and possibly other relevant components of the recommendation service 150. At block 302, the recommendation service 150 generates a probabilistic model of user-to-item associations with latent factors corresponding to personas. Illustratively, assume there are m users (indexed by i running through 1, 2, ..., m) and n items (indexed by j running through 1, 2, ..., n). In accordance with the model, each user may have associated numeric association measures to individual items. We may denote user i's association measure for item j by $r_{ij}$. Also, we may use R to denote the set of all observed association measures $r_{ij}$ (e.g., user ratings for items as explicitly included or directly derived from historical user-to-item interaction data) for corresponding (user, item) pairs.

In accordance with the model, a user can have one or more underlying personas. As discussed above, the personas may correspond to individuals with different preferences sharing a same user account (e.g., different family members such kids, husband or wife). The model may assume that each user can have up to p personas (indexed by k running through 1, 2, ..., p). The model further includes latent variables $z_{ij}$ to capture the persona of user i that contributes to or is responsible for user i's association with item j. Additionally, a separate f-dimensional latent factor $u_{ik}^{f \times 1}$ is associated with the $k^{th}$ persona for user i.

In accordance with the model, let $u_{ik}^{e \times 1}$ denote the features (e.g., age, gender, location, subscription information, etc.) for personas associated with user i and let $y_j^{h \times 1}$ denote the features (e.g., category, price, brand) for item j. Further, let $a_k^{1 \times e}$ be the weight vector for user features associated with persona k and $b^{1 \times h}$ the weight vector for the item features. The model further includes $c_{ik}^{f \times e}$ and $d^{f \times h}$ as weight matrices used to derive the means of latent factors for users and items, respectively.

A probabilistic generative model based on the above setup can be:
1. For each user i,
  (a) draw (p-dimensional) multinomial personal distribution $\theta_i \sim \text{Dir}(\alpha)$.
  (b) for each persona k,
    i. draw $\alpha_{ik} \sim N(a_k \cdot x_i, \sigma_a^2)$
    ii. draw latent factor $u_{ik} \sim N(c_k \cdot x_i, \sigma_c^2 \cdot I)$.
2. For each item j,
  (a) draw $\beta_j \sim N(b \cdot y_j, \sigma_b^2)$.
  (b) draw latent factor $v_j \sim N(d \cdot y_j, \sigma_d^2 \cdot I)$.
3. For each item j associated with user i,
  (a) draw latent persona $z_{ij} \sim \text{Mult}(\theta_i)$.
  (b) draw association measure $r_{ij} \sim N(\alpha_{iz_{ij}} + \beta_j + u_{iz_{ij}}^T \cdot v_j, \sigma_r^2)$.

Let $A=\{\alpha_{ik}\}$ and $B=\{\beta_j\}$ denote additional sets of latent factors besides $U=\{u_{ik}\}$ and $V=\{v_j\}$. Also, let $\Sigma=\{\sigma_r, \sigma_u, \sigma_v, \sigma_a, \sigma_b, \alpha, a_k, b, c_k, d\}$ denote a set of parameters for the model, and $X=\{x_i\}$ and $Y=\{y_j\}$ denote the sets of user and item features, respectively. We may further denote by Z the set of all latent variables $z_{ij}$ that correspond to all the observed association measures $r_{ij} \in R$. Further, $\Theta=\{\theta_i\}$.

At block 403, the recommendation service 150 determines optimal values for model parameters based on existing user-to-item interaction data. Illustratively, the recommendation service 150 may implement a type of EM algorithm to achieve this based on some or all of the observed association measures $r_{ij} \in R$. A traditional EM algorithm may iterate through successive expectation (E) and maximization (M) steps until the solution converges. In the expectation, or E-step, current parameter values are utilized to find the posterior distribution of latent factors and variables. Then this posterior distribution can be utilized to find the expectation of the complete-data log likelihood. In the maximization, or M-step, new parameter values that maximize the expected complete-data log likelihood can be determined.

Since the posterior of the latent variables and factors of the model is not available in closed form, the recommendation service may implement a Monte Carlo EM (MCEM) algorithm where the traditional E-step is replaced by a Monte Carlo E-step that approximates the posterior of the latent variables and factors with samples drawn from the posterior (using Gibbs sampling as described below). Thus, in the E-step, the recommendation service computes the expected log-likelihood of complete data with respect to the conditional distribution of latent factors/variables by averaging over the posterior samples. Then, in the M-step of the MCEM algorithm, the recommendation service maximizes the expected log likelihood (from the E-step) with respect to parameters and obtain a new estimate of parameter values.

E-step. The equations for the conditional distributions of latent factors and variables for the Gibbs sampling step are derived below. The full joint data distribution is given by $$P(R, Z, U, V, A, B \mid X, Y, \Sigma) = P(R \mid Z, U, V, A, B, \Sigma) \cdot P(Z \mid \Sigma) \cdot$$
$$P(U \mid X, \Sigma) \cdot P(V \mid Y, \Sigma) \cdot P(A \mid X, \Sigma) \cdot$$
$$P(B \mid Y, \Sigma)$$
$$= P(R \mid Z, U, V, A, B, \sigma_r) \cdot \int_\Theta P(Z \mid \Theta) \cdot$$
$$P(\Theta \mid \alpha) d\Theta \cdot P(U \mid X, \{c_k\}, \sigma_u) \cdot$$
$$P(V \mid Y, d, \sigma_v) \cdot P(A \mid X, \{\alpha_k\}, \sigma_a) \cdot$$
$$P(B \mid Y, b, \sigma_b)$$
$$= \prod_{(i,j) \in R} N(r_{ij} \mid \alpha_{iz_{ij}} + \beta_j + u_{iz_{ij}}^T \cdot v_j, \sigma_r^2) \cdot$$
$$\prod_i \frac{\Delta(n_i + \alpha)}{\Delta(\alpha)} \cdot \prod_i \prod_k N(u_{ik} \mid c_k \cdot x_i, \sigma_u^2 \cdot I) \cdot \prod_j N(v_j \mid d \cdot y_j, \sigma_v^2 \cdot I) \cdot$$
$$\prod_i \prod_k N(\alpha_{ik} \mid a_k \cdot x_i, \sigma_a^2) \cdot \prod_j N(\beta_j \mid b \cdot y_j, \sigma_b^2)$$

Above $n_i$ is a vector $[n_{i1}, \ldots, n_{ik}, \ldots, n_{ip}]$ whose $k^{th}$ component is the number of association measures $r_{ij} \in R$ for user i such that $z_{ij}=k$. Also $$\Delta(\alpha) = \frac{\prod_k \Gamma(\alpha_k)}{\Gamma\left(\sum_k \alpha_k\right)}.$$

Now conditional distributions for $z_{ij}$, $u_{ik}$, $v_i$, $\alpha_{ik}$, $\beta_j$ can be derived.

The conditional distribution for $z_{ij}$ is given by $$P(z_{ij} = k \mid Z_{\neg ij}, R, U, V, A, B, X, Y, \Sigma) =$$
$$\frac{P(R, z_{ij} = k, Z_{\neg ij}, U, V, A, B \mid X, Y, \Sigma)}{\sum_{k=1}^{p} P(R, z_{ij} = k, Z_{\neg ij}, U, V, A, B \mid X, Y, \Sigma)} \propto$$
$$N(r_{ij} \mid \alpha_{ik} + \beta_j + u_{ik}^T \cdot v_j, \sigma_r^2) \cdot \frac{n'_{ik} + \alpha_{ik}}{\sum_k n'_{ik} + \alpha_k}$$

Above $n'_{ik}$ is the number of latent variables in Z (excluding $z_{ij}$) whose value is persona k for user i.

The condition distribution $u_{ik}$ is given by $$P(u_{ik} \mid R, Z, U_{\neg ik}, V, A, B) = \frac{P(R, Z, U, V, A, B \mid X, Y, \Sigma)}{\int_{u_{ik}} P(R, Z, U, V, A, B \mid X, Y, \Sigma) du_{ik}} \propto$$
$$\prod_{(i,j) \in R \wedge z_{ij}=k} N(r_{ij} \mid \alpha_{ik} + \beta_j + u_{ik}^T \cdot v_j, \sigma_r^2) \cdot N(u_{ik} \mid c_k \cdot x_i, \sigma_u^2 \cdot I)$$

This is a Gaussian distribution $N(u_{ik} \mid \mu^*_u, (\Sigma^*_u)^{-1})$ with mean $$\mu^*_u = (\sum_u^*)^{-1} \cdot \frac{1}{\sigma_r^2} \sum_{(i,j) \in R \wedge z_{ij}=k} (r_{ij} - \alpha_{ik} - \beta_j) \cdot v_j + \frac{1}{\sigma_u^2} \cdot c_k \cdot x_i)$$

and variance $$\sum_u^* = \frac{1}{\sigma_r^2} \cdot \sum_{(i,j) \in R \wedge z_{ij}=k} v_j \cdot v_j^T + \frac{1}{\sigma_u^2} \cdot I.$$

The conditional distribution for $v_j$ is given by $$P(v_j \mid R, Z, U, V_{\neg j}, A, B, X, Y, \Sigma) = \frac{P(R, Z, U, V, A, B \mid X, Y, \Sigma)}{\int_{v_j} P(R, Z, U, V, A, B \mid X, Y, \Sigma) dv_j} \propto$$
$$\prod_{(i,j) \in R} N(r_{ij} \mid \alpha_{iz_{ij}} + \beta_j + u_{iz_{ij}}^T \cdot v_j, \sigma_r^2) \cdot N(v_j \mid d \cdot y_j, \sigma_v^2 \cdot I)$$

This is a Gaussian distribution $N(v_j \mid \mu_v^*, (\Sigma^*_v)^{-1})$ with mean $$\mu_v^* = \left(\sum_v{}^*\right)^{-1} \cdot \left(\frac{1}{\sigma_r^2}\sum_{(i,j)\in R}(r_{ij} - \alpha_{iz_{ij}} - \beta_j)\cdot u_{iz_{ij}} + \frac{1}{\sigma_v^2}\cdot d\cdot y_j\right)$$

and variance $$\sum_v{}^* = \frac{1}{\sigma_r^2}\cdot\sum_{(i,j)\in R} u_{iz_{ij}}\cdot u_{iz_{ij}}^T + \frac{1}{\sigma_v^2}\cdot I.$$

The conditional distribution for $\alpha_{ik}$ is given by $$P(\alpha_{ik}|R, Z, U, V, A_{\neg ik}, B, X, Y, \Sigma) =$$

$$\frac{P(R, Z, U, V, A, B|X, Y, \Sigma)}{\int_{\alpha_{ik}} P(R, Z, U, V, A, B|X, Y, \Sigma)d\alpha_{ik}} \propto$$

$$\prod_{(i,j)\in R \wedge z_{ij}=k} N(r_{ij}|\alpha_{ik} + \beta_j + u_{ik}^T\cdot v_j, \sigma_r^2)\cdot N(\alpha_{ik}|a_k\cdot x_i, \sigma_a^2)$$

This is a Gaussian distribution $N(\alpha_{ik}|\mu_a^*, (\Sigma_a^*)^{-1})$ with mean $$\mu_a^* = \left(\sum_a{}^*\right)^{-1}\cdot\left(\frac{1}{\sigma_r^2}\sum_{(i,j)\in R\wedge z_{ij}=k}(r_{ij} - \beta_j - u_{ik}^T\cdot v_j) + \frac{1}{\sigma_a^2}\cdot a_k\cdot x_i\right)$$

and variance $$\sum_a{}^* = \sum_{(i,j)\in R\wedge z_{ij}=k}\frac{1}{\sigma_r^2} + \frac{1}{\sigma_a^2}.$$

The conditional distribution for $\beta_j$ is given by $$P(\beta_j|R, Z, U, V, A, B_{\neg j}, X, Y, \Sigma) =$$

$$\frac{P(R, Z, U, V, A, B|X, Y, \Sigma)}{\int_{\beta_j} P(R, Z, U, V, A, B|X, Y, \Sigma)d\beta_j} \propto$$

$$\prod_{(i,j)\in R} N(r_{ij}|\alpha_{iz_{ij}} + \beta_j + u_{iz_{ij}}^T\cdot v_j, \sigma_r^2)\cdot N(B_j|b\cdot y_j, \sigma_b^2)$$

This is a Gaussian distribution $N(\beta_j|\mu_b^*(\Sigma_b^*)^{-1})$ with mean $$\mu_b^* = \left(\sum_b{}^*\right)^{-1}\cdot\left(\frac{1}{\sigma_r^2}\sum_{(i,j)\in R}(r_{ij} - \alpha_{iz_{ij}} - u_{iz_{ij}}^T\cdot v_j) + \frac{1}{\sigma_b^2}\cdot b\cdot y_j\right)$$

and variance $$\sum_b{}^* = \sum_{(i,j)\in R}\frac{1}{\sigma_r^2} + \frac{1}{\sigma_b^2}.$$

The recommendation service may implement Gibbs sampling algorithm based on computer generated randomization to draw samples of the latent variables $z_{ij}$ and latent factors $\alpha_{ik}$, $\beta_j$, $u_{ik}$ and $v_j$ from their conditional distributions until convergence. We denote the s samples by $Z^1=\{z_{ij}^1\}$, $Z^2=\{z_{ij}^2\}$, ..., $Z^s=\{z_{ij}^s\}$, $U^1=\{u_{ik}^1\}$, $U^2=\{u_{ik}^2\}$, ..., $U^s=\{u_{ik}^s\}$, $V^1=\{v_j^1\}$, $V^2=\{v_j^2\}$, ..., $V^s=\{v_j^s\}$, $A^1=\{\alpha_{ik}^1\}$, $A^2=\{\alpha_{ik}^2\}$, ..., $A^s=\{\alpha_{ik}^s\}$, $B^1=\{\beta_j^1\}$, $B^2=\{\beta_j^2\}$, ..., $\beta^s=\{\beta_j^s\}$. In the E-step, the recommendation service computes the expected log-likelihood of complete data with respect to the conditional distribution of latent factors/variables by averaging over the posterior samples.

M-step. In the M-step of the MCEM algorithm, the recommendation service maximizes the expected log likelihood (from the E-step) with respect to model parameters and obtain a new estimate. Thus, the recommendation service computes values for $a_k$, b, $c_k$ and d that satisfy:

$$\arg\max_{a_k,b,c_k,d}\sum_Z\int_U\int_V\int_A\int_B P(Z, U, V, A, B|R, X, Y, \Sigma\ cur)$$

$$\ln P(R, Z, U, V, A, B|X, Y, \Sigma)dUdVdAdB$$

$$= \arg\max_{a_k,b,c_k,d}\frac{1}{s}\sum_l \ln P(R, Z^l, U^l, V^l, A^l, B^l|X, T, \Sigma)$$

$$= \arg\max_{a_k,b,c_k,d}\frac{1}{s}\sum_l \ln P(R|Z^l, U^l, V^l, A^l, B^l, \sigma_r) + \ln P(Z^l|\alpha) +$$

$$\ln P(U^l|X, \{c_k\}, \sigma_u) + \ln P(V^l|Y, d, \sigma_v) + \ln P(A^l|X, \{a_k\}, \sigma_a) +$$

$$\ln P(B^l|Y, b, \sigma_b)$$

$$= \arg\max_{a_k,b,c_k,d}\frac{1}{s}\sum_l \ln\prod_i\prod_k N(u_{ik}^l|c_k\cdot x_i, \sigma_u^2) + \ln\prod_j N(v_j^l|d\cdot y_j, \sigma_v^2) +$$

$$\ln\prod_i\prod_k N(\alpha_{ik}^l|a_k\cdot x_i, \sigma_a^2) + \ln\prod_j N(\beta_j^l|b\cdot y_j, \sigma_b^2)$$

$$= \arg\max_{a_k,b,c_k,d}\frac{1}{s}\sum_l\sum_i\sum_k\frac{1}{\sigma_u^2}\cdot(u_{ik}^l - c_k\cdot x_i)^2 + \sum_j\frac{1}{\sigma_v^2}\cdot(v_j^l - d\cdot y_j)^2 +$$

$$\sum_i\sum_k\frac{1}{\sigma_a^2}\cdot(\alpha_{ik}^l - a_k\cdot x_i)^2 + \sum_j\frac{1}{\sigma_b^2}\cdot(\beta_j^l - b\cdot y_j)^2$$

$\Sigma_{cur}$ above refers to the current value of model parameters.

Above, the recommendation service uses the Gibbs samples $Z^l$, $U^l$, $V^l$, $A^l$, $B^l$ to approximate the posterior distribution $P(Z, U, V, A, B|R, X, Y, \Sigma_{curr})$ and replaces the integral with averaging over the samples. The above four regression problems can be solved (e.g., using stochastic gradient descent (SGD) based on computer generated randomization) to obtain optimal values for parameters $a_k$, b, $c_k$ and d.

Accordingly, the recommendation service may start with an initial setting (e.g., predetermined or randomly assigned values) for the parameters $a_k$, b, $c_k$ and d, and perform multiple EM iterations of the E-step using Gibbs sampling (to estimate the posterior $P(Z, U, V, A, B|R, X, Y, \Sigma_{cur})$ followed by the M-step that computes new parameter values that maximize the expected log likelihood. The new parameter estimates are then fed back into the Gibbs sampling algorithm of the E-step in the next iteration. The E and M steps can be repeated multiple times until convergence (e.g., the change of parameter estimates between two consecutive rounds is smaller than a threshold).

One objective of the model is to predict an association measure $r_{ij}$ for a user i and an item j that has not been observed (e.g., user i's rating for item j is not explicitly included or cannot be directly derived from the user-to-item interaction data). At block 406, the recommendation service 150 generates a predictive probabilistic distribution that quantifies user-to-item association based on the model with optimized parameters. Given a user i and an item j, the predictive distribution for the association measure $r_{ij}$ can be obtained by averaging over the posteriors of $z_{ij}$, $\alpha_{ik}$, $v_j$, $\alpha_{ik}$ and $\beta_j$. The predictive distribution can be expressed as:

$$P(r_{ij} = r | R, X, Y, \Sigma) = \sum_Z \int_U \int_V \int_A \int_B P(r_{ij} =$$

$$r, Z, U, V, A, B | R, X, Y, \Sigma) dU dV dA dB$$

$$= \sum_Z \int_U \int_V \int_A \int_B P(r_{ij} = r | Z, U, V, A, B, \sigma_r) \cdot$$

$$P(Z, U, V, A, B | R, X, Y, \Sigma) dU dV dA dB$$

$$\approx \frac{1}{s} \sum_{l=1}^{s} P(r_{ij} = r | Z^l, U^l, V^l, A^l, B^l, \sigma_r)$$

$$\approx \frac{1}{s} \sum_{l=1}^{s} N\left(r \Big| \alpha_{iz_{ij}^l}^l + \beta_j^l + u_{iz_{ij}^l}^{lT} \cdot v_j^l, \sigma_r^2\right)$$

The recommendation service may approximate the marginalization of $P(r_{ij}=r|R, X, Y, \Sigma)$ with respect to the posterior of Z, U, V, A, B by averaging over all the $z_{ij}$, $u_{ik}$, $v_j$, $\alpha_{ik}$, $\beta_j$ samples. Note that personas with a higher probability should appear more often in the $z_{ij}$ samples. Thus, association measure predictions due to these personas will contribute more to the average, that is, their contribution to the average will be approximately equal to the probability of the persona.

In some embodiments, a new user i may not have posterior samples of $z_{ij}$, $\alpha_{ik}$ or $u_{ik}$. In this case, the recommendation service may use the prior mean values for latent user factors $\alpha_{ik}$ and $u_{ik}$ predicted purely by features $x_i$. Thus, $\alpha_{ik}=a_k \cdot x_i$ and $u_{ik}=c_k \cdot x_i$. Furthermore, the recommendation service may use the prior probability for each user persona, which is $$\frac{\alpha_k}{\sum_k \alpha_k}.$$

Thus, for a new user i, the predicted measure of association with item j is given by $$P(r_{ij} = r | R, X, Y, \Sigma) =$$

$$\sum_{k=1}^{p} \frac{1}{s} \sum_{l=1}^{s} N(r | \alpha_k \cdot x_i + \beta_j^l + c_k \cdot x_t^T \cdot v_j^l, \sigma_r^2) \cdot \frac{\alpha_k}{\sum_k \alpha_k}$$

New items j can be handled in a similar fashion using prior mean values $b \cdot y_j$ and $d \cdot y_j$ for latent item factors $\beta_j$ and $v_j$, respectively. These are predicted purely using item features.

At block 308, the recommendation service 150 determines items for recommendation to users in accordance with the predictive probabilistic distributions. Illustratively, for a target user i, the recommendation service 150 may compute respective expectation values of the user's association $r_{ij}$ with each item j of at least some subset of the total n items, based on their corresponding predictive probabilistic distributions. The recommendation service may sort or rank the association expectation values and decide to only present some items associated with top measures (e.g., those exceeding a certain threshold). At block 310, the recommendation service 150 may generate computer-executable code for implementing a user interface on a user device associated with the target user i. The user interface may present an ordered list of items as determined at block 308, and their associated popularity statistics or endorsement information.

Figure 4:
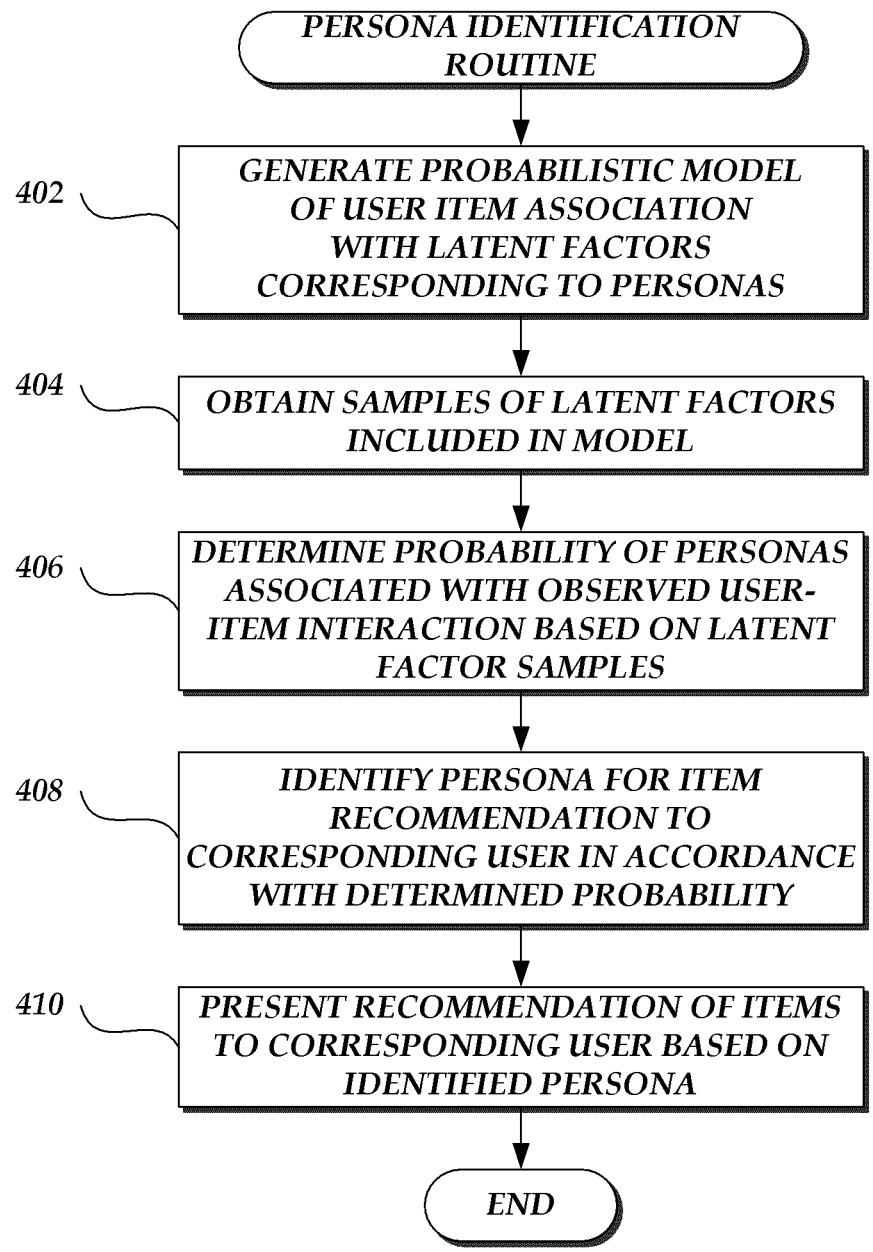
FIG. 4 illustrates an embodiment of a persona identification routine implemented by the recommendation service.

FIG. 4 illustrates an embodiment of a persona identification routine implemented by the persona oriented personalization component 152 and possibly other relevant components of the recommendation service 150. At block 402, the recommendation service 150 generates probabilistic model of user-to-item association with latent factors corresponding to personas. The implementation of block 402 may be the same as or similar to that of block 302 in FIG. 3, i.e., the recommendation service may generate a probabilistic generative model including various latent factors and parameters in an associated computer memory, using applicable data structures and computer-executable code that reflect their mathematical or logical relations in accordance with the model.

At block 404, the recommendation service 150 obtains samples of certain latent factors included in the model. This can be achieved in a same or similar fashion as the E-step of block 304 in FIG. 3, i.e., the Gibbs sampling as part of the MCEM algorithm. It should be noted that in situations where traditional EM algorithms are applicable to the model, the recommendation service may compute maximum-a-posteriori (MAP) estimates for the latent factors using stochastic gradient descent (SGD) methods.

At block 406, the recommendation service 150 determines probability of personas associated with observed user-to-item interactions based on the latent factor samples. As discussed earlier, each iteration of the MCEM algorithms comprises an M-step that optimizes the parameters ($a_k$, b, $c_k$, d) followed by an E-step that uses Gibbs sampling to obtain samples of all the relevant latent variables $(Z^l, U^l, V^l, A^l, B^l)_{l=1}^{s}$ to approximate all the relevant posterior distributions. When $r_{ij}=r$ is one of the observed user-to-item association measures used for inference in accordance with the MCEM algorithm, the samples $z_{ij}^l$ in the E-step are effectively drawn from the posterior distribution $P(z_{ij}|R;X;Y,\Sigma)$ where R includes all the observed association measures. Hence, the probability $P(z_{ij}=k|R;X,Y,\Sigma)$ can be approximated by the fraction of samples corresponding to $z_{ij}^l=k$ among all the samples (i.e., $$\frac{1}{s} \sum_{l=1}^{s} I(z_{ij}^l = k)$$

where I(•) denotes the indicator function).

In case the user-to-item association measure $r_{ij}=r$ is not among those used for inference (e.g., user i's more recent association or interactions with item j has not yet been included in the historical interaction data), the recommendation service may perform a partial E-step for that particular user i and item j to predict the corresponding persona distribution. For clarity, let $R_{-ij}$ and $Z_{-ij}$ denote all the observed user-to-item association measures and their corresponding latent personas excluding those of user i and item j pair. The probability of $r_{ij}=r$ being associated with persona k is given by $P(z_{ij}=k|r_{ij}=r; R_{\neg ij}, X, Y, \Sigma)$ and can be approximated as follows:

$$P(z_{ij} = k \mid r_{ij}, R_{\neg ij}, X, Y, \Sigma)$$

$$= \frac{P(z_{ij} = k, r_{ij}, R_{\neg ij} \mid X, Y, \Sigma)}{\sum_{k'} P(z_{ij} = k', R_{\neg ij} \mid X, Y, \Sigma)} \propto$$

$$P(r_{ij} \mid z_{ij} = k, R_{\neg ij}, X, Y, \Sigma) P(z_{ij} = k \mid R_{\neg ij}, X, Y, \Sigma)$$

$$= \sum_{Z_{\neg ij}} \int_U \int_V \int_A \int_B P(r_{ij} \mid z_{ij} = k, Z_{\neg ij}, R_{\neg ij}, U, V, A, B, X, Y, \Sigma)$$

$$P(r_{ij} \mid z_{ij} = k \mid Z_{\neg ij}, R_{\neg ij}, U, V, A, B, X, Y, \Sigma) \times$$

$$P(Z_{\neg ij}, U, V, A, B \mid R_{\neg ij} X, Y, \Sigma) dZ_{\neg ij} dU dV dA dB$$

$$= \sum_{Z_{\neg ij}} \int_U \int_V \int_A \int_B P(r_{ij} \mid z_{ij} = k, U, V, A, B, X, Y, \Sigma) P$$

$$(z_{ij} = k \mid Z_{\neg ij}, X, Y, \Sigma) \times P(Z_{\neg ij}, U, V, A, B \mid R_{\neg ij} X, Y, \Sigma)$$

$$dZ_{\neg ij} dU dV dA dB$$

$$\approx \frac{1}{s} \sum_{l=1}^{s} P(r_{ij} \mid z_{ij} = k, U^l, V^l, A^l, B^l, \Sigma) P(z_{ij} = k \mid Z_{\neg ij}^l, X, Y, \Sigma)$$

$$\approx \frac{1}{s} \sum_{l=1}^{s} N(r_{ij}; \alpha_{ik}^l + \beta_j^l + u_{ik}^{lT} \cdot v_j^l, \sigma_r^2) \frac{n_{ik}'^l + \alpha_k}{\sum_k n_{ik}'^l + \alpha_k},$$

where $n'_{ik}^l$ is the number of latent variables in $Z_{\neg ij}^l$, whose values are persona k for user i.

In other words, the posterior probability of persona k being associated with rating $r_{ij}$ of user i for item j is essentially proportional to the probability of rating $r_{ij}$ given persona k of user i times the fraction of past ratings by persona k for user i with appropriate marginalization over all the other latent variables.

At block 408, the recommendation service 150 identifies persona for item recommendation to corresponding user in accordance with the determined posterior probability. Once the above posterior probabilities are computed, the recommendation service may determine or predict that the persona corresponding to the highest probability as the most likely persona that has contributed to or is otherwise responsible for observed user-to-item association measure $r_{ij}=r$ (which may be explicitly reflected or derived from one or more recent interactions, such as those during a current browse session, between the user i and item j). Repeating the process for each observed user-to-item association measure may further allow the recommendation service to partition the user-to-item associations along personas.

At block 410, the recommendation service 150 presents recommendation of items to corresponding users based on identified persona. The partitioned associations may provide context or explanations for such recommendations. For example, the recommendation service may generate a user interface showing items that the user has interacted with in the past which were most likely attributable to the persona as identified at block 508, and present recommendation information regarding other items that the model predict as highly associated with the same persona.

To predict whether an item j is highly associated with a particular persona k that corresponds to a user i, the recommendation service may compute the probability of association measure $r_{ij}$ conditioned on $z_{ij}=k$. Assuming the recommendation service generates and applies the same model as in the routine of FIG. 3, the probability calculation is similar to the case without explicit persona information, with the difference that there is no need for summation across the multiple possible personas, i.e., $$P(r_{ij} \mid z_{ij} = k, R, X, Y, \Sigma) \approx \frac{1}{s} \sum_{l=1}^{s} N(r_{ij} \mid \alpha_{ik}^l + \beta_j^l + u_{ik}^{lT} \cdot v_j^l, \sigma_r^2)$$

Similarly to block 308 of FIG. 3, the recommendation service may compute respective expectation values of persona k's association $r_{ij}$ with each item j of at least some subset of the total n items, based on the above conditional probabilistic distribution. The recommendation service may sort or rank the association expectation values and decide to only present some items associated with top measures (e.g., those exceeding a certain threshold). Illustratively, a corresponding message displayed to user i may read: "You may have purchased A, B, and C using this account in the past, and we think you may also be interested in D or E."

In some embodiments, the recommendation service may present information regarding the currently identified persona or the persona-based partition of historical user-to-item interactions to users, and request users to confirm or correct these predictive determinations. The recommendation service may further utilized the user feedback for supervised learning of the associations among users, underlying personas, and items. In other embodiments, whenever the relevant persona of a user is identified during a particular interaction using other cues (e.g., browsing history), the item recommendations can be redefined by conditioning on this information.

Embodiments of the disclosure can be described in view of the following clauses:

Clause 1: A computer-implemented method, comprising:
maintaining, in computer storage, in association with a user account on a content site, a history of user interactions performed during browsing of the content site, the user interactions including selections of particular items represented in an electronic catalog;
determining, based on an automated analysis of the history of user interactions, a plurality of personas associated with the user account, at least one of the personas corresponding to a different item set than another one of the personas, the plurality of personas accounting for a possibility that the user account is shared by a plurality of individuals having differing item set affinities; and
subsequently, during a browsing session associated with the user account:
recording a sequence of user interactions with the content site;
matching the sequence of user interactions with a particular persona of the plurality of personas; and
generating, for presentation during the browsing session, personalized content that is personalized for the particular persona;
the method performed programmatically by one or more computing systems under control of executable program code.

Clause 2: The method of Clause 1, wherein the particular items include at least a product or service represented in the electronic catalog system.

Clause 3: The method of Clauses 1 and 2, wherein the particular items include at least a keyword, category, image, video, audio, or other digital representation of content.

Clause 4: The method of Clauses 1 to 3, wherein the plurality of personas associated with each user correspond to a plurality of family members of a household.

Clause 5: The method of Clauses 1 to 4, wherein the user interactions include at least one of purchasing, renting, licensing, searching, browsing, downloading, installing, adding to a wish list, saving, tagging, recommending, commenting on, or subscribing to any one of the items.

Clause 6: The method of Clauses 1 to 5, wherein matching the sequence of user interactions with a particular persona of the plurality of personas comprises determining a likelihood that one or more interaction instances of the sequence of user interactions are attributable to the particular persona.

Clause 7: The method of Clauses 1 to 6, wherein at least one of the items, users, or personas are mapped to latent factors in accordance with a user-item association model.

Clause 8: The method of Clause 7, wherein the latent factors correspond to multi-dimensional vectors.

Clause 9: The method of Clauses 7 and 8, wherein matching the sequence of user interactions with a particular persona of the plurality of personas is further based on the user-item association model.

Clause 10: The method of Clauses 1 to 9, wherein personalized content that is personalized for the particular persona comprises information about one or more items that are relatively more favored by the particular persona.

Clause 11: A non-transitory computer readable storage medium storing computer executable instructions that direct a computer system comprising one or more processors to perform operations comprising:
  obtaining digital records of a plurality of users' interactions with respect to a plurality of items;
  determining an active persona from a plurality of personas for a target user based, at least in part, on a user-item association model, wherein the plurality of personas are defined at least partly by the user-item association model and automatically inferred based, at least in part, on the digital records;
  identifying a target item for the target user based, at least in part, on the active persona; and
  causing presentation to the target user of a recommendation of the target item.

Clause 12: The non-transitory computer readable storage medium of Clause 11, wherein the plurality of users include the target user.

Clause 13: The non-transitory computer readable storage medium of Clauses 11 and 12, wherein the plurality of items include the target item.

Clause 14: The non-transitory computer readable storage medium of Clauses 11 to 13, wherein at least one of the plurality of items, users, or personas are mapped to latent factors in accordance with the user-item association model.

Clause 15: The non-transitory computer readable storage medium of Clauses 11 to 14, wherein determining an active persona is further based on at least one recent interaction between the target user and the plurality of items.

Clause 16: The non-transitory computer readable storage medium of Clause 15, wherein presentation of the recommendation is implemented within a threshold period of time after the recent interaction.

Clause 17: A system having one or more processors, the system comprising:
  an electronic data repository that stores data of interactions between a plurality of users with respect to a plurality of items, the electronic data repository comprising a computer memory; and
  a computer system comprising one or more processors, the computer system configured to at least:
    determine an active persona from a plurality of personas for a target user based, at least in part, on a user-item association model, wherein the plurality of personas are defined at least partly by the user-item association model and automatically inferred based, at least in part, on the data of interactions between the plurality of users and the plurality of items;
    identify a target item for recommendation to the target user based, at least in part, on the active persona; and
    cause presentation to the target user a recommendation of the target item.

Clause 18: The system of Clause 17, wherein determining the active persona for the target user is further based on the target user's interactions with respect to the plurality of items.

Clause 19: The system of Clauses 17 and 18, wherein individual users or items are associated with a corresponding feature vector in accordance with the user-item association model.

Clause 20: The system of Clause 19, wherein individual users or items are associated with a corresponding latent factor, the latent factor derived mathematically from at least one corresponding user or item feature vector.

Clause 21: A method for discovering underlying personas associated with users, the method comprising:
  for each user of a plurality of users, obtaining one or more measures of affinity between the user and specific items of a plurality of items;
  generating a user-item association model in a computer memory based, at least in part, on probabilistic matrix factorization, wherein each user is associated with a plurality of personas in accordance with a persona distribution;
  optimizing the user-item association model based, at least in part, on computer generated randomization, wherein the computer generated randomization is constrained by the obtained affinity measures;
  determining an active persona for a target user based, at least in part, on the optimized user-item association model, wherein the active persona corresponds to the persona associated with an active browsing session;
  estimating a measure of affinity between the target user and a target item based, at least in part, on the active persona; and
  causing presentation to the target user information regarding the target item;
  the method performed programmatically by one or more computing systems under control of executable program code.

Clause 22: The method of Clause 21, wherein the plurality of items include at least a product or service represented in the electronic catalog system.

Clause 23: The method of Clauses 21 and 22, wherein the plurality of items include at least a keyword, category, image, video, audio, or other digital representation of content.

Clause 24: The method of Clauses 21 to 23, wherein the plurality of personas associated with each user correspond to a plurality of family members of a household.

Clause 25: The method of Clauses 21 to 24, wherein the persona distribution corresponds to a multinomial distribution.

Clause 26: The method of Clauses 21 to 25, wherein each persona of the plurality of personas is associated with at least one latent persona factor.

Clause 27: The method of Clause 26, wherein the at least one latent persona factor corresponds to a vector drawn from a Gaussian distribution.

Clause 28: The method of Clauses 21 to 27, wherein optimizing the user-item association model comprises determining parameters values for the user-item association model based on an expectation and maximization (EM) algorithm.

Clause 29: The method of Clause 28, wherein the EM algorithm corresponds to a Monte Carlo EM algorithm.

Clause 30: The method of Clause 29, wherein determining the active persona comprises determining a probability that a persona is associated with the target user in accordance with the user-item association model.

Clause 31: A non-transitory computer readable storage medium storing computer executable instructions that direct a computer system comprising one or more processors to perform operations comprising:
  optimizing a user-item association model based, at least in part, on computer generated randomization, wherein the user-item association model is based on probabilistic matrix factorization and wherein the computer generated randomization is constrained by predetermined user-to-item affinity measures;
  determining an active persona for a target user based, at least in part, on the optimized user-item association model, wherein a relatively recent interaction between the target user and an item is attributable to the active persona; and
  causing presentation to the target user information regarding one or more target items in accordance with the active persona.

Clause 32: The non-transitory computer readable storage medium of Clause 31, wherein the user-item association model comprises representation of a plurality of users each associated with one or more personas.

Clause 33: The non-transitory computer readable storage medium of Clause 32, wherein the one or more personas are associated with respective one or more latent factors in accordance with the user-item association model.

Clause 34: The non-transitory computer readable storage medium of Clause 33, wherein the computer generated randomization comprises generating samples of the one or more latent factors.

Clause 35: The non-transitory computer readable storage medium of Clauses 31 to 34, wherein determining an active persona is further based on at least one recent interaction between the target user and at least one item.

Clause 36: A system having one or more processors, the system comprising:
  an electronic data repository that stores data regarding affinity measures for a plurality of users with respect to a plurality of items, the electronic data repository comprising a computer memory; and
  a computer system comprising one or more processors, the computer system configured to at least:
    optimize a user-item association model based, at least in part, on computer generated randomization, wherein the user-item association model is based on probabilistic matrix factorization and wherein the computer generated randomization is constrained by the affinity measures;
    determine an active persona for a target user based, at least in part, on the optimized user-item association model, wherein a relatively recent interaction between the target user and an item is attributable to the active persona; and
    cause presentation to the target user information regarding one or more target items in accordance with the active persona.

Clause 37: The system of Clause 36, wherein data regarding affinity measures for one or more users with respect to one or more items is not available.

Clause 38: The system of Clauses 36 and 37, wherein the plurality of users include the target user.

Clause 39: The system of Clauses 36 to 38, wherein the user-item association model associates each user of a subset of the plurality of users with a plurality of personas.

Clause 40: The system of Clauses 36 to 39, wherein the computer generated randomization is implemented in accordance with an expectation and maximization (EM) algorithm.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware, or as software executed by hardware, depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a computing device, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for generating item recommendations, the method comprising:

for each user of a plurality of users, obtaining one or more measures of affinity between the user and specific items of a plurality of items represented in an electronic catalog;

generating a user-item association model in a computer memory based, at least in part, on probabilistic matrix factorization, wherein the user-item association model associates a user account with a plurality of personas in accordance with a persona distribution, each persona corresponding to a different respective group of catalog items;

optimizing the user-item association model based, at least in part, on computer generated randomization, wherein the computer generated randomization is constrained by the obtained affinity measures; and during a browsing session of a target user:

recording interactions of the target user with the electronic catalog;

associating the browsing session with the user account;

determining an active persona for the browsing session based, at least in part, on the optimized user-item association model and the interactions recorded during the browsing session, wherein the active persona is one of the plurality of personas;

generating persona-specific recommendations of catalog items for the target user based on item preferences associated with the active persona; and generating, and outputting for presentation to the target user, a user interface that displays the persona-specific recommendations;

the method performed programmatically by one or more computing systems under control of executable program code.

2. The method of claim 1, wherein the plurality of items include at least a product or service represented in the electronic catalog.

3. The method of claim 1, wherein the plurality of personas correspond to a plurality of family members of a household.

4. The method of claim 1, wherein the persona distribution corresponds to a multinomial distribution.

5. The method of claim 1, wherein each persona of the plurality of personas is associated with at least one latent persona factor.

6. The method of claim 5, wherein the at least one latent persona factor corresponds to a vector drawn from a Gaussian distribution.

7. The method of claim 1, wherein optimizing the user-item association model comprises determining parameter values for the user-item association model based on an expectation and maximization (EM) algorithm.

8. The method of claim 7, wherein the EM algorithm corresponds to a Monte Carlo EM algorithm.

9. The method of claim 8, wherein determining the active persona comprises determining a probability that a persona is associated with the target user in accordance with the user-item association model.

10. A non-transitory computer readable storage medium storing computer executable instructions that direct a computer system comprising one or more processors to perform operations comprising:

optimizing a user-item association model based, at least in part, on computer generated randomization, wherein the user-item association model is based on probabilistic matrix factorization and wherein the computer generated randomization is constrained by predetermined user-to-item affinity measures;

identifying, based on the user-item association model, a plurality of personas associated with a user account;

recording user interactions of a target user with electronic content during a browsing session;

associating the browsing session with the user account;

determining an active persona for the browsing session based, at least in part, on the optimized user-item association model and the recorded user interactions, the active persona being one of the plurality of personas associated with the user account; and generating, during the browsing session, for presentation to the target user, a user interface comprising information regarding one or more target items, the user interface personalized for the active persona.

11. The non-transitory computer readable storage medium of claim 10, wherein the user-item association model comprises a representation of a plurality of users each associated with one or more personas.

12. The non-transitory computer readable storage medium of claim 11, wherein the one or more personas are associated with respective one or more latent factors in accordance with the user-item association model.

13. The non-transitory computer readable storage medium of claim 12, wherein the computer generated randomization comprises generating samples of the one or more latent factors.

14. The non-transitory computer readable storage medium of claim 10, wherein the user interactions are with an electronic catalog, and the user interface includes catalog item recommendations that are personalized for the active persona.

15. A system having one or more processors, the system comprising:

an electronic data repository that stores data regarding affinity measures for a plurality of users with respect to a plurality of items represented in an electronic catalog, the electronic data repository comprising a computer memory; and a computer system comprising one or more processors, the computer system configured to at least:

optimize a user-item association model based, at least in part, on computer generated randomization, wherein the user-item association model is based on probabilistic matrix factorization and wherein the computer generated randomization is constrained by the affinity measures;

determine, using the user-item association model, a plurality of personas associated with a user account, each persona corresponding to a different respective group of the plurality of items;

record user interactions of a target user with the electronic catalog during a browsing session;

associate the browsing session with the user account;

determine an active persona for the browsing session based, at least in part, on the optimized user-item association model and the recorded user interactions, the active persona being one of the plurality of personas associated with the user account; and generate, for presentation to the target user, a user interface comprising information regarding one or more target items, the user interface personalized for the active persona.

16. The system of claim 15, wherein data regarding affinity measures for one or more users with respect to one or more items is not available.

17. The system of claim 15, wherein the plurality of users include the target user.

18. The system of claim 15, wherein the user-item association model associates each user of a subset of the plurality of users with a plurality of personas.

19. The system of claim 15, wherein the computer generated randomization is implemented in accordance with an expectation and maximization (EM) algorithm.

20. The system of claim 15, wherein the computer system is programmed to generate item recommendations that are personalized for the active persona, and to output a representation of the item recommendations to the target user during the browsing session.

* * * * *